(12) United States Patent
Yamamoto

(10) Patent No.: US 10,486,701 B2
(45) Date of Patent: * Nov. 26, 2019

(54) DRIVING CONTROL DEVICE, DRIVING CONTROL METHOD AND VEHICLE-TO-VEHICLE COMMUNICATION SYSTEM

(71) Applicant: NEC CORPORATION, Tokyo (JP)

(72) Inventor: Takeshi Yamamoto, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 95 days.

This patent is subject to a terminal disclaimer.

(21) Appl. No.: 15/558,382

(22) PCT Filed: Mar. 10, 2016

(86) PCT No.: PCT/JP2016/001330
§ 371 (c)(1),
(2) Date: Sep. 14, 2017

(87) PCT Pub. No.: WO2016/147622
PCT Pub. Date: Sep. 22, 2016

(65) Prior Publication Data
US 2018/0079419 A1 Mar. 22, 2018

(30) Foreign Application Priority Data

Mar. 18, 2015 (JP) ................ 2015-054561

(51) Int. Cl.
*G01S 19/13* (2010.01)
*B60W 30/18* (2012.01)
(Continued)

(52) U.S. Cl.
CPC ....... *B60W 30/18163* (2013.01); *B60R 21/00* (2013.01); *G05D 1/0027* (2013.01);
(Continued)

(58) Field of Classification Search
CPC ....... H04W 4/023; H04W 4/046; H04W 4/90; G01S 5/0027; G01S 19/13; G01S 19/17;
(Continued)

(56) References Cited

U.S. PATENT DOCUMENTS 6,873,911 B2 * 3/2005 Nishira ................ B60T 7/16
340/436
7,657,373 B2 * 2/2010 Kindo ................ G01C 21/26
382/113
(Continued)

FOREIGN PATENT DOCUMENTS

JP 11-328597 A 11/1999
JP 2003-228800 A 8/2003
(Continued)

OTHER PUBLICATIONS

Takatori et al., A study of driving assistance system based on a fusion network of inter-vehicle communication and in-vehicle external sensors, 2011, IEEE, p. 254-259 (Year: 2011).*
(Continued)

*Primary Examiner* — McDieunel Marc
(74) *Attorney, Agent, or Firm* — Sughrue Mion, PLLC

(57) ABSTRACT

Provided are a driving control method and device in which an actual driving operation is performed after vehicles communicate with each other regarding a safety check by vehicle-to-vehicle communication in advance, thereby making it possible to smoothly and safely change lanes or merge when a vehicle is changing lanes or merging by automatic driving. The driving control device is provided with: a sensor unit that detects vehicles around a vehicle; a vehicle-mounted communication device that transmits and receives information including an identification number and position information to/from vehicle-mounted communication devices that are mounted to the vehicles around the vehicle and maintains said information as a table; a travel determi-
(Continued)

nation unit for determining travel control for the vehicle on the basis of the detection result of the sensor unit and the table maintained by the vehicle-mounted communication device; and a travel control unit that controls the travel of the vehicle on the basis of the result determined by the travel determination unit. The driving control device is characterized in that when the vehicle is changing lanes, the travel determination unit identifies a following linearly traveling vehicle in the lane that is the lane change destination from the detection result of the sensor unit and selects the identification number of the following linearly traveling vehicle from the table maintained by the vehicle-mounted communication device, and the vehicle-mounted communication device uses the identification number to transmit information requesting a lane change to the following linearly traveling vehicle in unicast format.

10 Claims, 8 Drawing Sheets

(51) Int. Cl.
- *H04W 4/46* (2018.01)
- *H04W 4/02* (2018.01)
- *B60R 21/00* (2006.01)
- *H04W 4/04* (2009.01)
- *G05D 1/00* (2006.01)
- *G05D 1/02* (2006.01)
- *G08G 1/16* (2006.01)
- *G08G 1/0967* (2006.01)

(52) U.S. Cl.
CPC ..... *G05D 1/0276* (2013.01); *G08G 1/096725* (2013.01); *G08G 1/096741* (2013.01); *G08G 1/096791* (2013.01); *G08G 1/162* (2013.01); *G08G 1/167* (2013.01); *H04W 4/027* (2013.01); *H04W 4/04* (2013.01); *H04W 4/46* (2018.02); *B60W 2550/408* (2013.01); *G05D 2201/0213* (2013.01)

(58) Field of Classification Search
CPC ...... G01S 19/51; E01F 9/662; G06F 3/04817; H04B 1/385; B60R 21/00; G05D 1/0212; G01C 21/26; B60T 7/16
See application file for complete search history.

(56) References Cited

U.S. PATENT DOCUMENTS

| | | | | |
|---|---|---|---|---|
| 8,798,907 | B2* | 8/2014 | Shida | G01S 5/0072 |
| | | | | 701/301 |
| 8,914,181 | B2 | 12/2014 | Essame et al. | |
| 2008/0316052 | A1 | 12/2008 | Ruffini | |
| 2013/0030687 | A1 | 1/2013 | Shida | |
| 2014/0104077 | A1* | 4/2014 | Engel | G08G 1/0962 |
| | | | | 340/901 |
| 2014/0343836 | A1* | 11/2014 | Maise | G08G 1/162 |
| | | | | 701/301 |
| 2018/0053404 | A1* | 2/2018 | Horita | B60R 21/00 |
| 2018/0061236 | A1* | 3/2018 | Yamamoto | B60R 21/00 |
| 2018/0157262 | A1* | 6/2018 | Ao | G05D 1/0212 |

FOREIGN PATENT DOCUMENTS

| | | | |
|---|---|---|---|
| JP | 2005-050187 | A | 2/2005 |
| JP | 2007-176355 | A | 7/2007 |
| JP | 2008-507884 | A | 3/2008 |
| JP | 2010-086269 | A | 4/2010 |
| JP | 2013-160560 | A | 8/2013 |
| JP | 2014-078171 | A | 5/2014 |
| JP | 2014-134897 | A | 7/2014 |
| JP | WO2016/147623 | A1 | 9/2016 |

OTHER PUBLICATIONS

Ohnishi et al., Development of Automatic Driving System on Rough Road—Realization of High Reliable Automatic Driving System, 1992, IEEE, p. 148-153 (Year: 1992).*
Mihai et al., GPS based road monitoring system, 2010, IEEE, p. 1-4 (Year: 2010).*
Hisaka et al., On-board wireless sensor for collision avoidance: Vehicle and pedestrian detection at intersection, 2011, IEEE, p. 198-205 (Year: 2011).*
International Search Report for PCT/JP2016/001330 dated Apr. 12, 2016 [PCT/ISA/210].
Written Opinion for PCT/JP2016/001330 dated Apr. 12, 2016 [PCT/ISA/237].
Extended European Search Report dated Nov. 13, 2018 issued by the European Patent Office in counterpart application No. 16764454.1.
Communication dated Sep. 10, 2019, from the Japanese Patent Office in counterpart Application No. 2017-506078.

* cited by examiner

Fig.4

SURROUNDING COMMUNICATION DEVICE TABLE OF VEHICLE A

| | ACQUIRE FROM COMMUNICATION | | |
|---|---|---|---|
| | ID | POSITION | TIME |
| VEHICLE-MOUNTED COMMUNICATION DEVICE B | 123.456.78.90 | (X1, Y1, Z1) | 2015/02/24 10:26:51 |
| VEHICLE-MOUNTED COMMUNICATION DEVICE C | 123.456.78.91 | (X2, Y2, Z2) | 2015/02/24 10:26:50 |
| VEHICLE-MOUNTED COMMUNICATION DEVICE D | 123.456.78.92 | (X3, Y3, Z3) | 2015/02/24 10:26:53 |

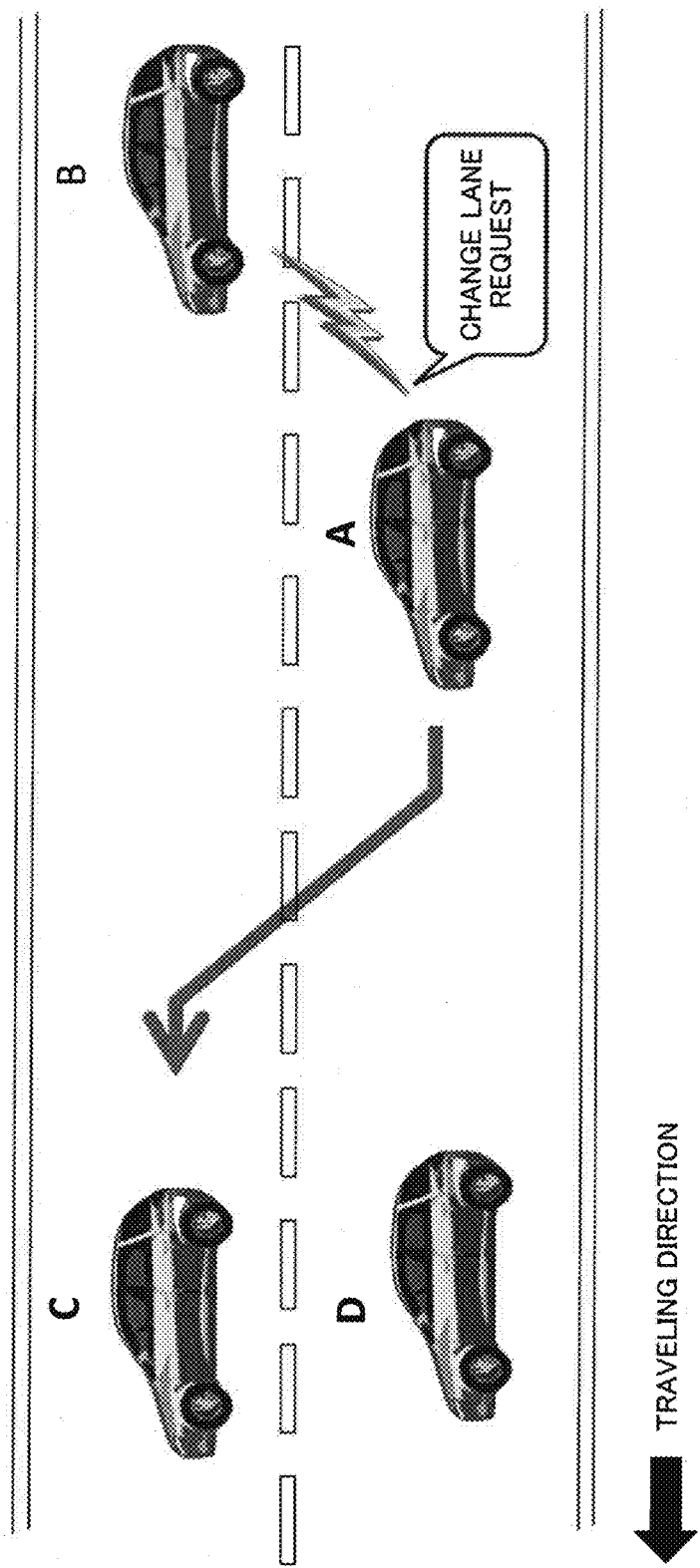

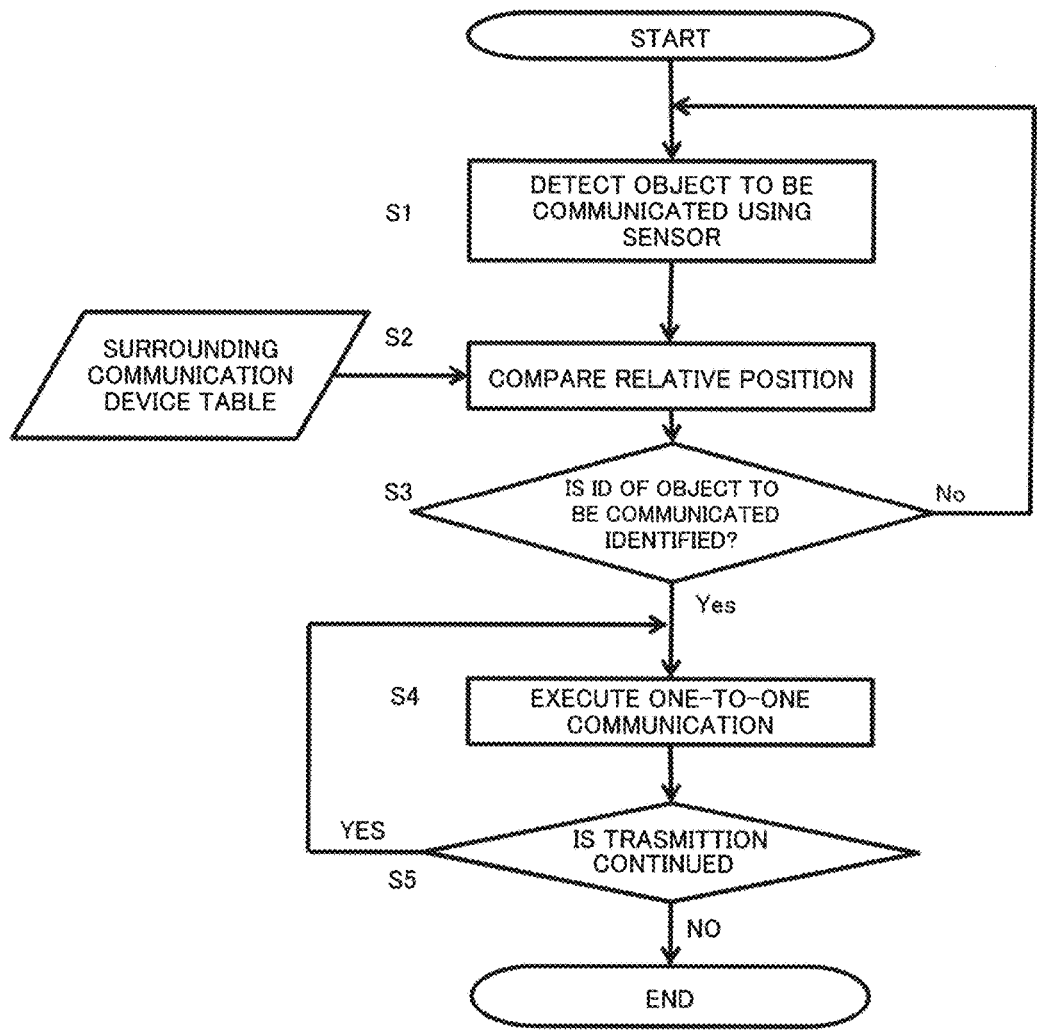

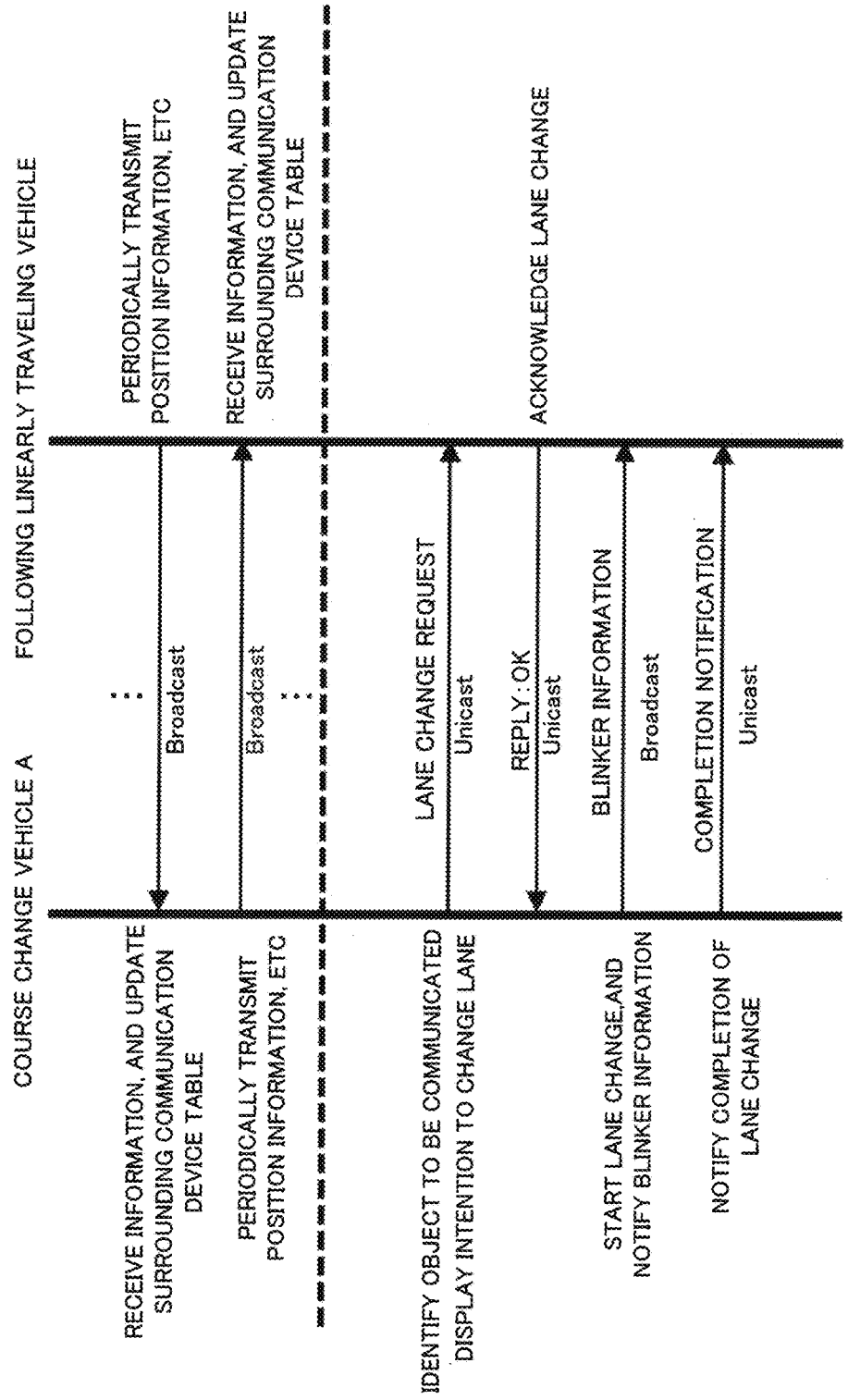

DRIVING CONTROL DEVICE, DRIVING CONTROL METHOD AND VEHICLE-TO-VEHICLE COMMUNICATION SYSTEM

CROSS REFERENCE TO RELATED APPLICATIONS

This application is a National Stage of International Application No. PCT/JP2016/001330 filed Mar. 10, 2016, claiming priority based on Japanese Patent Application No. 2015-054561 filed Mar. 18, 2015, the contents of all of which are incorporated herein by reference in their entirety.

TECHNICAL FIELD

The present invention relates a control device in an automatic driving system of a vehicle, and especially relates to a driving control device, a driving control method and a vehicle-to-vehicle communication system for transmitting and receiving information through a vehicle-to-vehicle communication.

BACKGROUND ART

In recent years, an automatic driving technology of a vehicle is actively researched. Such automatic driving technology includes: a technique of recognizing an obstacle using an on-vehicle sensor and applying an automatic brake when a crash will be happened and; a technique of detecting a position/speed of circumferential vehicles and autonomously adjusting the vehicle speed to keep the inter-vehicular distance with a preceding vehicle constant and the automatic driving technology is realized in a part of vehicles.

In future, to realize more high levels of automatic traveling, not only the adjustment for keeping the vehicle speed and the inter-vehicular distance on the same lane, but also a travel control when a vehicle changes a lane, joins/divides to/from a lane, and turns right or left is needed. When the change of the lanes and the joining/dividing to/from a lane are performed, especially it is needed to ensure the safety and the smoothness of the traffic stream.

In a conventional travel control when a vehicle changes the lane, joins/divides to/from a lane, and turns right or left, drivers use a visual contact and a blinker to recognize each other and accordingly a timing to change the lanes and join/divide to/from a lane is adjusted. In the automatic driving technology, it is needed to automatically and smoothly perform the control which is the same as the operations of the driver.

However, a real traffic environment is complicated, and it is very difficult to decide the timing to change the lanes and join/divide to/from a lane only with the on-vehicle sensor such as a camera and a radar. This is because the travel control of an own-vehicle is largely varied depending on an unpredictable traveling behavior of vehicles around the own-vehicle.

Then, in addition to the peripheral recognition with the on-vehicle sensor, it is proposed to collect information around the vehicle using the vehicle-to-vehicle communication or the road-to-vehicle communication technique. For example, Patent Literature 1 (PTL1) discloses a drive assist method for performing the vehicle-to-vehicle communication between the joining vehicle which is traveling on the joining road and the vehicle traveling on the main road and determining whether to change the lanes based on the times needed for the joining vehicle to arrive at a junction.

CITATION LIST

Patent Literature

[PTL1] Japanese Patent Application Laid-open No. 11-328597
[PTL2] Japanese Patent Application Laid-open No. 2007-176355
[PTL3] Japanese Patent Application Laid-open No. 2014-78171
[PTL4] Japanese Patent Application Laid-open No. 2010-86269

SUMMARY OF INVENTION

Technical Problem

PTL1 discloses, in the drive assist method, a driving control for improving the reliability of functions to detect the vehicle or the obstacle using the road sensor and the on-vehicle sensor by concurrently using the vehicle-to-vehicle communication and the road-to-vehicle communication.

In the drive assist method disclosed in Patent Literature 2 (PTL2), pieces of information on the position and the speed are transmit and received among vehicles by the broadcast communication to grasp the position and the speed of the vehicles around the own-vehicle and such information is used for the driving control.

However, the vehicle-to-vehicle/road-to-vehicle communications disclosed in PTL1 and PTL2 merely serve to improve the detecting function of the sensor which recognizes the vehicles around the own-vehicle. A specific study for the safety check technique as a mutual recognition is insufficient between the vehicle traveling on the main road and the vehicle which intends to change the lanes when a vehicle changes the lanes, joins/divides to/from a lane, and turns right or left.

Patent Literature 3 (PTL3) relates to a circumferential vehicle recognition device and proposes to obtain vehicle condition notification information transmitted from the vehicle-mounted communication device which is mounted on the circumferential vehicle around the own-vehicle and to use such information to perform the travel control such as platoon traveling with circumferential vehicles and releasing such traveling. Patent Literature 4 (PTL4) relates to a drive assist device which is mounted on the vehicle and proposes to identify vehicles by associating another vehicle detected by a sensor mounted on the own-vehicle with still another vehicle which acquires information via the vehicle-to-vehicle communication or the road-to-vehicle communication. PTL4 proposes to use such vehicle identification for the drive assist such as avoidance of the crash with another vehicle.

The present invention is made in view of the above described problems, and an object of the present invention is to provide a driving control method and a device which allow vehicles to smoothly and safely change the lane or join to the lane by positively communicating among the vehicles in advance for safety check and then performing the driving operation when the vehicle changes the lane or joins to the lane by the automatic traveling.

Solution to Problem

A driving control device according to an aspect of the present invention is a driving control device for controlling driving of a vehicle, and is characterized in that the driving control device comprises:

a sensor unit that detects a circumferential vehicle of an own-vehicle;

a vehicle-mounted communication device that mutually transmits and receives information including an identification number and position information with a vehicle-mounted communication device mounted on the circumferential vehicle of the own-vehicle and maintains the information as a table;

a travel determination unit that determines a travel control of the own-vehicle based on a detection result of the sensor unit and the table maintained by the vehicle-mounted communication device; and a travel control unit that controls traveling of the own-vehicle based on a result obtained by a determination made by the travel determination unit, wherein;

when the own-vehicle changes a lane, the travel determination unit identifies a following traveling vehicle on a change destination lane based on a detection result of the sensor unit and selects an identification number of the following traveling vehicle from the table maintained by the vehicle-mounted communication device, and the vehicle-mounted communication device uses the identification number and transmits, to the following traveling vehicle, information on a lane change request by unicast.

A driving control method according to the other aspect of the present invention is a driving control method for controlling driving of a vehicle when a lane is changed, and is characterized in that the driving control method comprises:

identifying a following traveling vehicle on a change destination lane through a sensor unit mounted on an own-vehicle;

transmitting and receiving information including an identification number and position information between a vehicle-mounted communication device mounted on the own-vehicle and a vehicle-mounted communication device mounted on a circumferential vehicle of the own-vehicle and maintaining the information as a table;

selecting the identification number of the following traveling vehicle from the table maintained by the vehicle-mounted communication device and transmitting information on a lane change request, to the following traveling vehicle using the identification number by unicast; and performing a lane change after the vehicle-mounted communication device receives, from the following traveling vehicle, a reply to acknowledge the lane change by unicast.

A vehicle-to-vehicle communication system according to further the other aspect of the present invention is a vehicle-to-vehicle communication system for performing a communication among moving vehicles, and is characterized in that:

a following traveling vehicle on a change destination lane is identified by a sensor unit mounted on an own-vehicle when a lane is changed;

information including an identification number and position information is mutually transmitted and received between a vehicle-mounted communication device mounted on the own-vehicle and a vehicle-mounted communication device mounted on a circumferential vehicle of the own-vehicle and the information is maintained as a table;

the identification number of the following traveling vehicle is selected from the table maintained by the vehicle-mounted communication device and information on a lane change request is transmitted to the following traveling vehicle using the identification number by unicast; and a lane change is performed after the vehicle-mounted communication device receives, from the following traveling vehicle, a reply to acknowledge the lane change by unicast.

Advantageous Effect of Invention

With this configuration, it is possible to provide the driving control method and the device which allow the vehicle to smoothly and safely change the lane or join to the lane by positively communicating among the vehicles in advance for safety check and then performing the driving operation when the vehicle changes the lane or joins to the lane by the automatic traveling.

BRIEF DESCRIPTION OF DRAWINGS

FIG. 4 is a surrounding communication device table representing information detected by the vehicle-mounted communication device according to the example embodiment of the present invention.

FIG. 5 is a diagram illustrating an image where lanes are changed according to the example embodiment of the present invention.

FIG. 6 is an operation flow chart of a lane changing vehicle A when changing the lane according to the example embodiment of the present invention.

FIG. 7 is a sequence diagram of the vehicle-to-vehicle communication between a vehicle-mounted communication device of the lane changing vehicle A which intends to change the lane and a vehicle-mounted communication device of a following linearly traveling vehicle B according to the example embodiment of the present invention.

DESCRIPTION OF EMBODIMENTS

Figure 1:
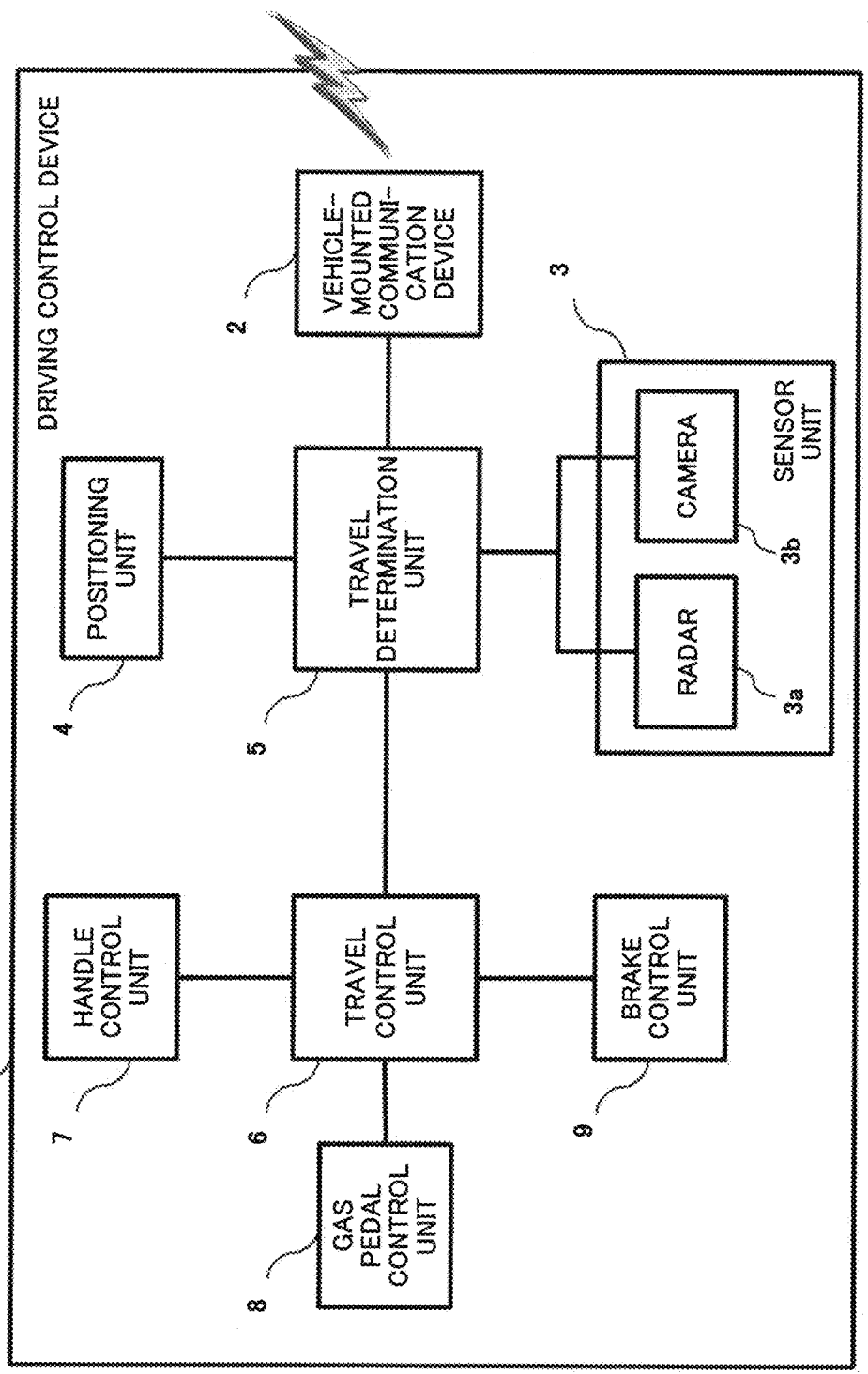
FIG. 1 is a block diagram of a driving control device according to the example embodiment of the present invention.

Hereinafter, a configuration of the driving control device according to the example embodiments of the present invention will be described with reference to the drawings. FIG. 1 is a block diagram of the driving control device according to the example embodiment of the present invention. A driving control device 1 according to the example embodiments of the present invention includes a vehicle-mounted communication device 2, a sensor unit 3, a travel determination unit 5, and a travel control unit 6. Further, the driving control device 1 of FIG. 1 includes a positioning unit 4, a handle control unit 7, a gas pedal control unit 8, and a brake control unit 9.

The vehicle-mounted communication device 2 mutually transmits and receives pieces of information including identification numbers and position information with a vehicle-mounted communication device mounted on a vehicle which is present around the own-vehicle and maintains such information as a table. More specifically, the vehicle-mounted communication device 2 performs a bidirectional wireless communication with a roadside communicator or another vehicle-mounted communication device which is present around the own-vehicle. The vehicle-mounted communication device 2 receives data via the vehicle-to-vehicle communication or the road-to-vehicle communication and then supplies the data to the travel determination unit 5. The travel determination unit 5 recognizes a traveling environment around the own-vehicle based on the data received by the vehicle-mounted communication device 2.

Figure 2:
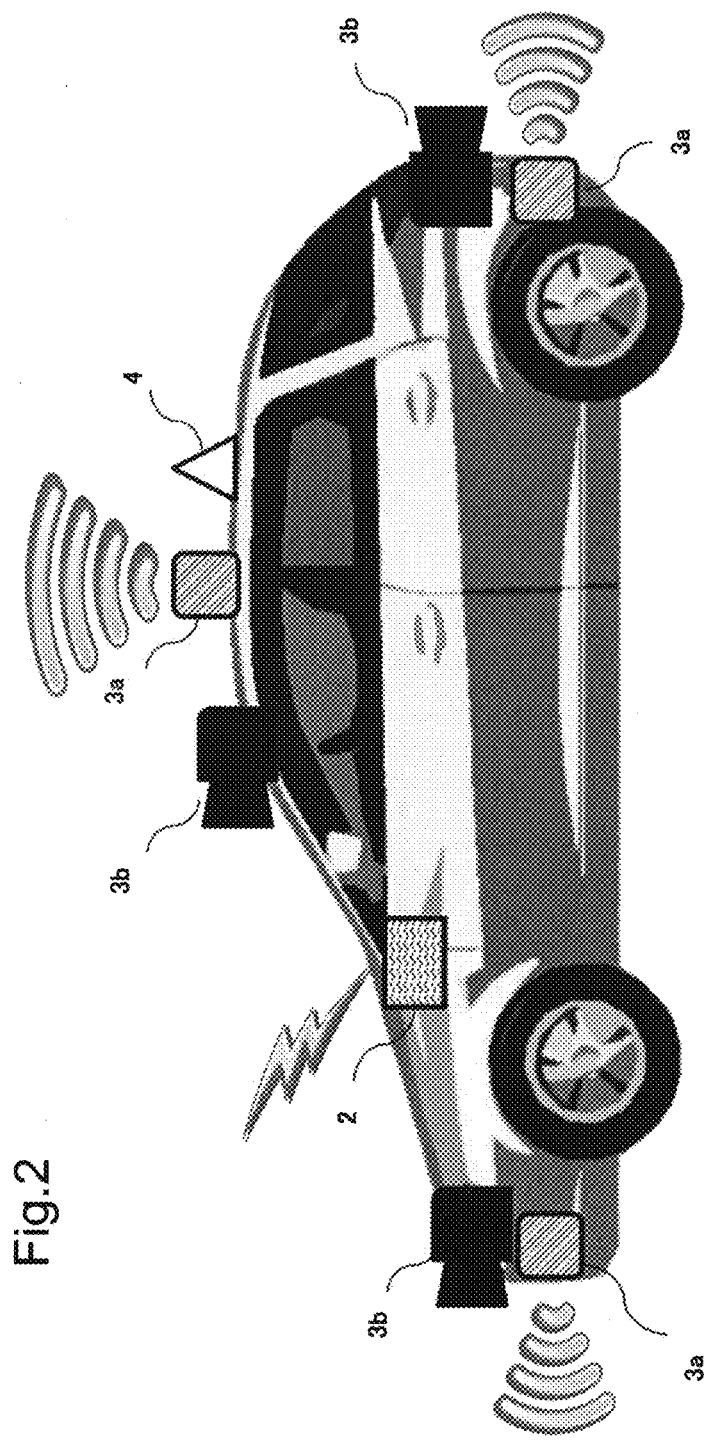
FIG. 2 is an example of a mounted sensor of the driving control device according to the example embodiment of the present invention.

The sensor unit 3 senses the vehicles around the own-vehicle. The sensor unit 3 includes a radar 3a and a camera 3b which are mounted on a predetermined position of the vehicle body. FIG. 2 illustrates an example of a mounted sensor in the vehicle body of the driving control device according to the example embodiment of the present invention.

The radar 3a is a millimeter-wave radar located in front of the radiator grill of the vehicle or a laser radar located at a ceiling, and based on a time and an angle needed for receiving a reflective wave of a signal transmitted from an antenna of the radar, measures a relative distance, a relative speed, and direction between the own-vehicle and the detected object. Determination as to whether the detected object is the traveling vehicle or the stationary object is made based on the camera image and the calculation of the relative speed between the speeds of the own-vehicle and the detected object.

The camera 3b is an optical camera or an infrared camera such as a CCD and a CMOS and is located in the vicinity of the vehicle body, takes a photograph of the circumference of the vehicle, and recognizes the circumferential object. The signal outputted from the sensor unit 3 is supplied to the travel determination unit 5. Through the detection signals of the sensor unit 3, the travel determination unit 5 detects the traveling vehicle or the obstacle around the own-vehicle.

The positioning unit 4, based on the signals transmitted from GPS satellites, acquires a current position of the vehicle. The signals outputted from the positioning unit 4 are supplied to the travel determination unit 5.

The travel determination unit 5 determines the travel control state or the traveling situation of the own-vehicle based on a detection result of the sensor unit 3 and a table maintained by the vehicle-mounted communication device 2. The travel determination unit 5 is configured by a microcomputer and the like. The travel determination unit 5, based on the traveling environment around the own-vehicle obtained by the vehicle-mounted communication device 2, the sensor unit 3, the positioning unit 4 and the like, calculates the crash possibility or the inter-vehicular distance with the circumferential vehicle and generates a control signal for a traveling speed and a steering direction so that the own-vehicle can safely travel.

The travel control unit 6 controls traveling of the vehicle body. More specifically, the travel control unit 6 controls traveling of the own-vehicle based on a result obtained by the determination made by the travel determination unit 5. Further, the travel control unit 6 detects the current position or the vehicle speed of the own-vehicle and based on the control signal generated by the travel determination unit 5, operates a handle, a gas pedal, the brake and the like for the autonomous traveling of the own-vehicle.

When the own-vehicle changes the lanes, the travel determination unit 5, based on the detection result of the sensor unit 3, identifies the following linearly traveling vehicle which travels on a lane to which the own-vehicle intends to change the lane. Further, the travel determination unit 5, based on the table maintained by the vehicle-mounted communication device 2, selects the identification number of the following linearly traveling vehicle. The vehicle-mounted communication device 2 uses the above described identification number to transmit, to the following linearly traveling vehicle, information on a lane change request by unicast.

Hereinafter, operations of the driving control device are described.

Figure 3:
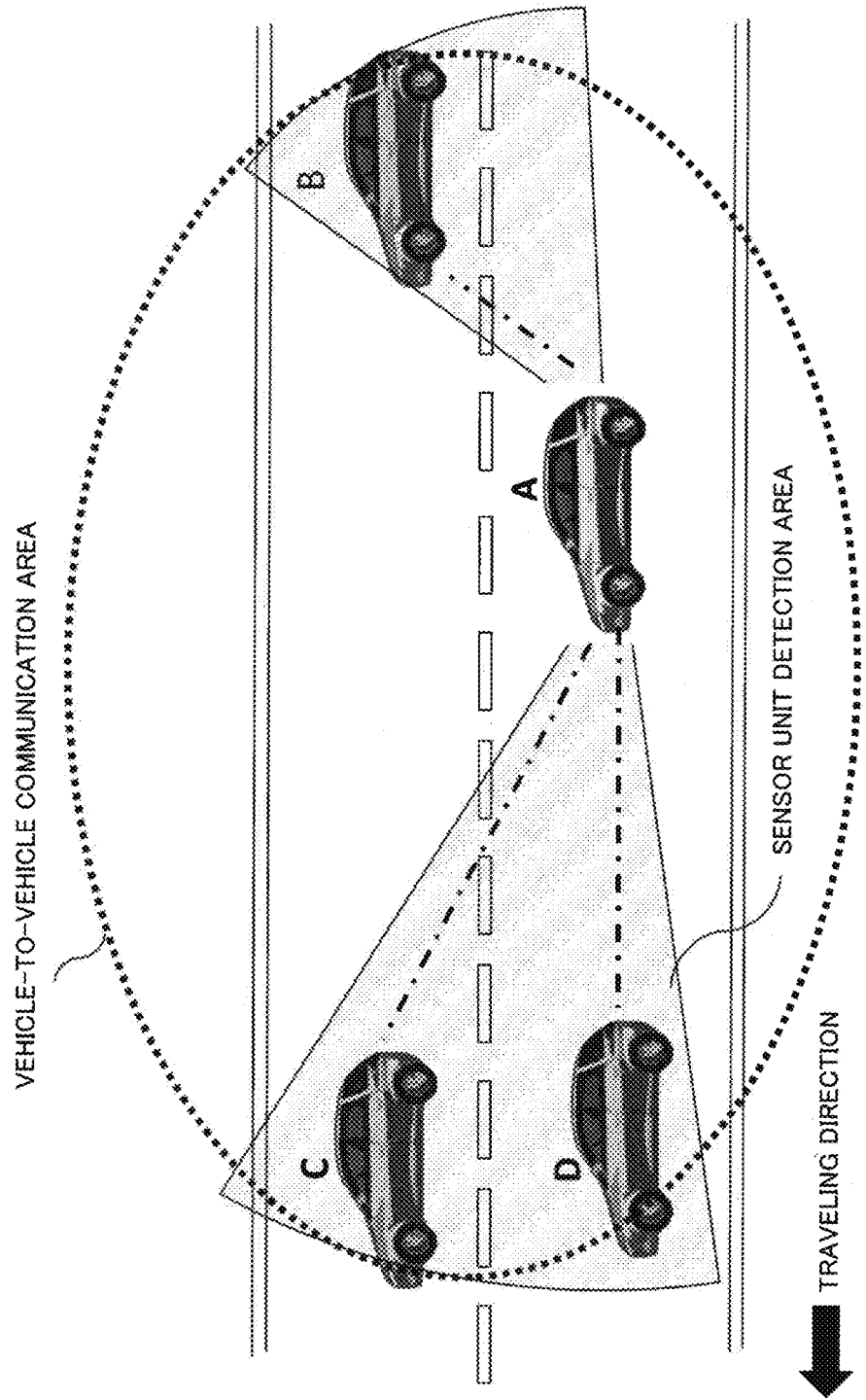
FIG. 3 is a diagram illustrating an image where vehicles around an own-vehicle are detected by the driving control device according to the example embodiment of the present invention.

The driving control device according to the example embodiment of the present invention performs the automatic travel control while detecting the traveling situations of the circumferential vehicles with the sensor unit and the vehicle-mounted communication device as illustrated in FIG. 3. FIG. 3 is a diagram illustrating an image where vehicles around the own-vehicle of the driving control device according to the example embodiment of the present invention are detected.

The sensor unit in the vehicle A of FIG. 3 detects side-by-side traveling vehicles that are present around the own-vehicle as illustrated in FIG. 3. The sensor unit in the vehicle A measures the relative distance, the relative speed, and directions between the vehicle A and circumferential side-by-side traveling vehicles.

The vehicle-mounted communication device of the vehicle A, in a range where radio waves reach as represented by a dot-dash-line in FIG. 3, performs the wireless bidirectional communication, i.e., the vehicle-to-vehicle communication with each of vehicle-mounted communication devices of the circumferential vehicle B, vehicle C and vehicle D. Each vehicle-mounted communication device periodically transmits the identification data (hereinafter referred to as "ID") and the position information of the own terminal to circumferential terminals by broadcast. The ID is an IP address (Internet Protocol address) or the like for identifying an object to be communicated.

The vehicle-mounted communication device of the vehicle A associates the ID and the position information received from the vehicle-mounted communication device mounted on the circumferential vehicle with a time and maintains the obtained information as a surrounding communication device table. FIG. 4 illustrates the surrounding communication device table of the vehicle A.

The surrounding communication device table updates information each time a new signal is received. Further, each data may be deleted if no update is made for a predetermined time. The surrounding communication device table is supplied to the travel determination unit and used by the travel determination unit to grasp information on the circumferential vehicles.

The vehicle-mounted communication device may be configured to receive information relayed by the roadside communicator in addition to receiving, via a direct communication, information on position and the traveling speeds of the circumferential vehicles. Further, the vehicle-mounted communication device at a position where the radio waves from the transmitter, i.e., the vehicle-mounted communication device do not reach, may receive a signal relayed by another vehicle-mounted communication device which is present within a range of the radio waves. Accordingly, it is possible to recognize the presence of the vehicle outside the rage where the radio waves directly reach.

The travel determination unit, based on pieces of information on circumferential vehicle B, vehicle C, and vehicle D acquired by the vehicle-mounted communication device and the sensor unit of the vehicle A, calculates an optimum traveling schedule in which the position and the traveling speed of the vehicle A are safe and efficient relative to the circumferential vehicle B, vehicle C, and vehicle D. The travel control unit, based on the result, operates the handle by the handle control unit 7 of the vehicle A, the gas pedal by the gas pedal control unit 8, and the brake by the brake control unit 9 for performing the automatic travel control.

Hereinafter, operations when the lanes are changed are described with reference to FIG. 5 and FIG. 6. FIG. 5 is a diagram illustrating an image of a lane change operation according to the example embodiment of the present invention.

First, processing performed by a course change vehicle A which changes the lanes is described. FIG. 6 is an operation flow chart of the course change vehicle A when changing the lanes.

In order to smoothly change the lanes, not only grasping how vehicles travel on a lane to which the own-vehicle intends to change the lane, grasping of the situation of the lane on which the own-vehicle is traveling are needed. Therefore, when the lanes need to be changed depending on the traveling route to the destination, the travel determination unit of the course change vehicle A verifies in advance whether the lanes can be safely changed. The verification as to whether the lanes can be safely changed is based on the determination as to whether the inter-vehicular distance between the own-vehicle A, and the vehicle B and the vehicle C on the change destination lane continues to be equal to or above a predetermined threshold value set in advance, for example, when the lanes are changed. When the inter-vehicular distance is predicted to be equal to or below the predetermined threshold value set in advance, the change of the lane is not allowed, and alternatively, only when the inter-vehicular distance is greater than the predetermined threshold value set in advance, the change of the lane is allowed.

The travel determination unit of the course change vehicle A, whenever the vehicle is traveling, recognizes the position and the vehicle speed of the own-vehicle and the circumferential vehicles based on the position of the own-vehicle obtained from the positioning unit, the vehicle speed obtained from the travel control unit, the surrounding communication device table obtained from the vehicle-mounted communication device and the information obtained from the sensor unit.

When it is determined that the change of the lane is possible, the travel determination unit of the course change vehicle A identifies, as a following linearly traveling vehicle, the vehicle B which travels side by side on the change destination lane and comes to be a rearward of the course change vehicle A and comes to have a minimum relative distance among the circumferential side-by-side traveling vehicle B, side-by-side traveling vehicle C, and side-by-side traveling vehicle D detected by the sensor unit. That is, through the sensor unit, the following linearly traveling vehicle to be communicated is detected (step S1).

Next, the travel determination unit of the course change vehicle A selects the ID of the identified following linearly traveling vehicle B from the surrounding communication device table. As a selection of the ID of the following linearly traveling vehicle B, the travel determination unit of the course change vehicle A compares the position information of the vehicle B detected by the sensor unit with pieces of position information of circumferential vehicle B, vehicle C, and vehicle D registered in the surrounding communication device table, and identifies the ID of the vehicle having a position information error which is equal to or below the threshold value and is minimum as the ID of the following linearly traveling vehicle B. That is, referring to the position information registered in the surrounding communication device table, a relative position with the following linearly traveling vehicle B is compared (step S2). The recognition of the following linearly traveling vehicle may be determined by taking into consideration of the pieces of information such as a traveling direction, a traveling speed, and an acceleration in addition to the position information. Accordingly, the recognition accuracy can be improved.

Whether the ID of the following linearly traveling vehicle can be identified is determined (step S3). When the position information error in the surrounding communication device table is equal to or above the threshold value, the ID of the following linearly traveling vehicle B may not be identified, and thus, steps S1 to S3 are repeated.

When the lanes are determined to be changeable and the ID of the following linearly traveling vehicle B is identified, the travel determination unit selects the following linearly traveling vehicle B as an object to be communicated, and supplies, to the vehicle-mounted communication device, a lane change request signal for requesting the lane change. The vehicle-mounted communication device transmits, to the following linearly traveling vehicle B, the lane change request signal by unicast using the ID of the following linearly traveling vehicle B identified from the surrounding communication device table.

The travel determination unit of the course change vehicle A verifies, whether, from following linearly traveling vehicle B, the response to authorize the lane change request is received in response to the lane change request signal transmitted from the vehicle-mounted communication device.

The one-to-one communication with the following linearly traveling vehicle B is performed (step S4). That is, when determining that the vehicle-mounted communication device receives, from the following linearly traveling vehicle B, the response to authorize the lane change request, the travel determination unit of the course change vehicle A instructs the travel control unit to change the lanes and the course change vehicle A actually changes the lanes.

Further, the travel determination unit of the course change vehicle A supplies, to the vehicle-mounted communication device, a blinker information signal to start the lane change. The vehicle-mounted communication device transmits the blinker information signals to the circumferential vehicle B, vehicle C, and vehicle D by broadcast.

After the change of the lanes is completed, the travel determination unit of the course change vehicle A supplies a lane change completion signal to the vehicle-mounted communication device, and the vehicle-mounted communication device of the course change vehicle A transmits, to the following linearly traveling vehicle B, the lane change completion signal by unicast. The travel determination unit determines whether to continue the transmission (step S5), and when the transmission is not continued, the lane change operation is ended.

Next, processing performed by the following linearly traveling vehicle B which comes to be a joined side by the change of the lanes is described with reference to FIG. 7.

As same as the course change vehicle A, the following linearly traveling vehicle B also, whenever traveling, recognizes the positions and the vehicle speeds of the own-vehicle and circumferential vehicles based on the position of the own-vehicle obtained from the positioning unit, the vehicle speed obtained from the travel control unit, the surrounding communication device table obtained from the vehicle-mounted communication device and information supplied from the sensor unit.

The travel determination unit of the following linearly traveling vehicle B traveling side by side on the change destination lane recognizes the presence of a vehicle which will join the lane on which the own-vehicle is traveling by receiving, with the vehicle-mounted communication device, the lane change request from the circumferential vehicles.

Next, the travel determination unit of the following linearly traveling vehicle B identifies the vehicles which will join the lane using the ID.

The travel determination unit of the following linearly traveling vehicle B predicts, if the course change vehicle A joins to the lane, whether the following linearly traveling vehicle B can keep safe traveling, and based on the prediction result, transmits the response to the received lane change request.

Predicting whether the safe traveling can be kept is based on, for example, when the course change vehicle A joins to the lane, the determination as to whether the inter-vehicular distances between the own-vehicle B and the course change vehicle A, and the own-vehicle B and the following linearly traveling vehicle of the own-vehicle can be kept to be equal to or above a predetermined threshold value set in advance; when the distance is equal to or below the predetermined threshold value set in advance, the change of the lane is not possible, and alternatively, only when the distance is greater than the predetermined threshold value set in advance, the change of the lane is possible.

The travel determination unit of the course change vehicle B supplies, to the vehicle-mounted communication device, a signal indicating Yes when joining of the vehicle A to the lane is authorized and a signal indicating No when joining of the vehicle A to the lane is rejected. The vehicle-mounted communication device transmits, to the vehicle A, a response result, i.e., signal indicating Yes/No by unicast in response to the lane change request.

The following linearly traveling vehicle B replies, to the vehicle A, i.e., the transmitter to acknowledge the change of the lanes and performs a speed control such as a deceleration to ensure a needed inter-vehicular distance so that the vehicle A identified by the sensor unit can safely join to the lane as needed, and accordingly, the crash is avoided.

The following linearly traveling vehicle B receives, with the vehicle-mounted communication device, a signal for notifying the completion of the change of the lanes of the course change vehicle A, and returns to the usual autonomous travel control.

(Other Example Embodiments)

The above described driving control device or driving control method can also be realized by an information processor which can execute a program for implementing the above described configuration and operation. The program may be distributed in the form of a computer readable recording medium. By reading the program stored in such record medium and executing the program with the information processor, functions of the present example embodiment may be realized via software.

Figure 8A:
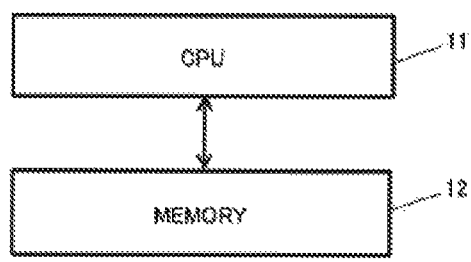
FIG. 8A is a block configuration diagram for explaining a partial configuration of the driving control device according to another example embodiment.

FIG. 8A is a diagram exemplifying a configuration of a computer applicable to the driving control method according to the example embodiments of the present invention. Directions of arrows in the drawing are exemplary, and do not limit directions of signals among blocks.

Figure 8B:
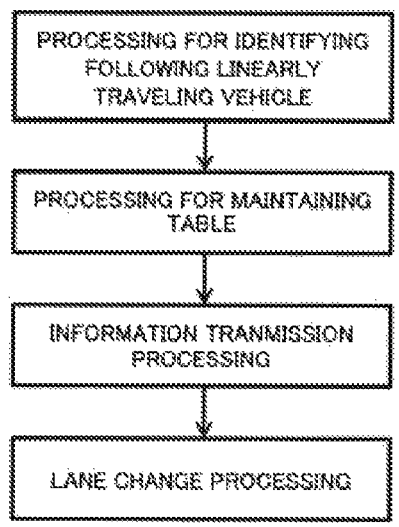
FIG. 8B is a flow diagram illustrating processing performed in another example embodiment.

As illustrated in FIG. 8A, the information processor includes a CPU (Central Processing Unit) 11 and a memory 12 configured with, an RAM (Random Access Memory) and the like. With the information processor having such hardware configuration, the travel determination unit 5 and the travel control unit 6 according to the example embodiments of the present invention can be realized. That is, a part or the whole of the travel determination unit 5 and the travel control unit 6 of FIG. 1 can be realized by reading a program which executes each processing as illustrated in FIG. 8B and causing the information processor to execute the program. Specific processing is as illustrated in FIG. 8B, identification processing for identifying the following linearly traveling vehicle on the change destination lane by the sensor unit 3 mounted on the own-vehicle and maintaining processing for transmitting and receiving pieces of information including identification numbers and the position information between the vehicle-mounted communication device 2 mounted on the own-vehicle and vehicle-mounted communication devices mounted on vehicles around the own-vehicle with one another and maintaining such information as a table. Further, the processing is, as illustrated in FIG. 8B, the transmission processing of selecting the identification number of the following linearly traveling vehicle from a table maintained by the vehicle-mounted communication device 2 and transmitting, to the following linearly traveling vehicle, information on the lane change request using the identification number by unicast. Still further, as illustrated in FIG. 8B, the processing is the lane change processing for performing the lane change after the vehicle-mounted communication device 2 has received, from the following linearly traveling vehicle, the reply to notify the acknowledgement of the lane change by unicast.

Further, the program can be distributed in the form of a record medium storing the program. This program may be distributed in the form of all-purpose semiconductor recording devices such as CF (Compact Flash (Registered Trademark)) and an SD (Secure Digital), a magnetic recording medium such as a flexible disk, or an optical recording medium such as a CD-ROM (Compact Disc Read Only Memory).

A plurality of example embodiments of the present invention have been described, but the present invention is not construed to be limited to the above described example embodiments, and is applicable to various example embodiments and a combination thereof without departing from the scope of the present invention. In other words, within a scope of the present invention, various aspects which could be understood by a person skilled in the art are applicable in the present invention.

A part or the whole of the above described example embodiments can be described as following supplementary notes, but are not limited to below.

(Supplementary note 1): A driving control device for controlling driving of a vehicle, the driving control device including:

a sensor unit that detects a circumferential vehicle of an own-vehicle;

a vehicle-mounted communication device that mutually transmits and receives information including an identification number and position information with a vehicle-mounted communication device mounted on the circumferential vehicle of the own-vehicle and maintains the information as a table;

a travel determination unit that determines a travel control of the own-vehicle based on a detection result of the sensor unit and the table maintained by the vehicle-mounted communication device; and a travel control unit that controls traveling of the own-vehicle based on a result obtained by a determination made by the travel determination unit, wherein;

when the own-vehicle changes a lane, the travel determination unit identifies a following traveling vehicle on a change destination lane based on a detection result of the sensor unit and selects an identification number of the following traveling vehicle from the table maintained by the vehicle-mounted communication device, and the vehicle-mounted communication device uses the identification number and transmits, to the following traveling vehicle, information on a lane change request by unicast.

(Supplementary note 2): A driving control device according to supplementary note 1, wherein the travel determination unit compares a relative distance between the circumferential vehicle detected by the sensor unit and the own-vehicle with position information in the table maintained by the vehicle-mounted communication device and determines a vehicle having an error which is equal to or below a predetermined threshold value as the following traveling vehicle.

(Supplementary note 3): A driving control device according to supplementary note 1 or 2, wherein the travel control unit changes the lane after the vehicle-mounted communication device receives, from the following traveling vehicle, a reply to acknowledge a lane change by unicast.

(Supplementary note 4): A driving control device according to any one of supplementary notes 1 to 3, wherein when the lane is changed, the vehicle-mounted communication device transmits, to the circumferential vehicle, information on the lane change by broadcast.

(Supplementary note 5): A driving control device according to any one of supplementary notes 1 to 4, wherein when the lane change is completed, the vehicle-mounted communication device transmits, to the following traveling vehicle, a content to notify completion of the lane change by unicast.

(Supplementary note 6): A driving control method for controlling driving of a vehicle when a lane is changed, the driving control method including:

identifying a following traveling vehicle on a change destination lane through a sensor unit mounted on an own-vehicle;

transmitting and receiving information including an identification number and position information between a vehicle-mounted communication device mounted on the own-vehicle and a vehicle-mounted communication device mounted on a circumferential vehicle of the own-vehicle and maintaining the information as a table;

selecting the identification number of the following traveling vehicle from the table maintained by the vehicle-mounted communication device and transmitting information on a lane change request, to the following traveling vehicle using the identification number by unicast; and performing a lane change after the vehicle-mounted communication device receives, from the following traveling vehicle, a reply to acknowledge the lane change by unicast.

(Supplementary note 7): A driving control method according to supplementary note 6, wherein a relative distance between the circumferential vehicle detected by the sensor unit and the own-vehicle and position information in the table maintained by the vehicle-mounted communication device are compared and a vehicle having an error which is equal to or below a predetermined threshold value is determined as the following traveling vehicle.

(Supplementary note 8): A vehicle-to-vehicle communication system for performing a communication among moving vehicles wherein:

a following traveling vehicle on a change destination lane is identified by a sensor unit mounted on an own-vehicle when a lane is changed;

information including an identification number and position information is mutually transmitted and received between a vehicle-mounted communication device mounted on the own-vehicle and a vehicle-mounted communication device mounted on a circumferential vehicle of the own-vehicle and the information is maintained as a table;

the identification number of the following traveling vehicle is selected from the table maintained by the vehicle-mounted communication device and information on a lane change request is transmitted to the following traveling vehicle using the identification number by unicast; and a lane change is performed after the vehicle-mounted communication device receives, from the following traveling vehicle, a reply to acknowledge the lane change by unicast.

(Supplementary note 9): A vehicle-to-vehicle communication system according to supplementary note 8, wherein a relative distance between the circumferential vehicle detected by the sensor unit and the own-vehicle and position information in the table maintained by the vehicle-mounted communication device are compared and a vehicle having an error which is equal to or below a predetermined threshold value is determined as the following traveling vehicle.

(Supplementary note 10): A record medium recording a drive control program for controlling driving a vehicle when a lane is changed, the record medium causing a computer to execute the processes of:

identifying a following traveling vehicle on a change destination lane by a sensor unit mounted on an own-vehicle;

mutually transmitting and receiving information including an identification number and position information between a vehicle-mounted communication device mounted on the own-vehicle and a vehicle-mounted communication device mounted on a circumferential vehicle of the own-vehicle and maintaining the information as a table;

selecting the identification number of the following traveling vehicle from the table maintained by the vehicle-mounted communication device and transmitting, to the following traveling vehicle, information on a lane change request using the identification number by unicast; and performing a lane change after the vehicle-mounted communication device receives, from the following traveling vehicle, a reply to acknowledge the lane change by unicast.

(Supplementary note 11): A record medium recording a drive control program according to supplementary note 10 causing a computer to execute the process of comparing a relative distance between the circumferential vehicle detected by the sensor unit and the own-vehicle with position information in the table maintained by the vehicle-mounted communication device and determining a vehicle having an error which is equal to or below a predetermined threshold value as the following traveling vehicle.

This application is based upon and claims the benefit of priority from Japanese Patent Application No. 2015-54561, filed on Mar. 18, 2015, the disclosure of which is incorporated herein in its entirety by reference.

REFERENCE SIGNS LIST

1 Driving control device
2 Vehicle-mounted communication device
3 Sensor unit
3a Radar
3b Camera
4 Positioning unit
5 Travel determination unit
6 Travel control unit
7 Handle control unit
8 Gas pedal control unit
9 Brake control unit
11 CPU
12 Memory

The invention claimed is:

1. A driving control device for controlling driving of a vehicle, the driving control device comprising:
a sensor unit that detects a circumferential vehicle of an own-vehicle;
a vehicle-mounted communication device that mutually transmits and receives information including an identification number and position information with a vehicle-mounted communication device mounted on the circumferential vehicle of the own-vehicle and maintains the information as a table;
a travel determination unit that determines a travel control of the own-vehicle based on a detection result of the sensor unit and the table maintained by the vehicle-mounted communication device; and
a travel control unit that controls traveling of the own-vehicle based on a result obtained by a determination made by the travel determination unit, wherein;
when the own-vehicle changes a lane, the travel determination unit identifies a following traveling vehicle on a change destination lane based on a detection result of the sensor unit and selects an identification number of the following traveling vehicle from the table maintained by the vehicle-mounted communication device, and the vehicle-mounted communication device uses the identification number and transmits, to the following traveling vehicle, information on a lane change request by unicast.

2. A driving control device according to claim 1, wherein the travel determination unit compares a relative distance between the circumferential vehicle detected by the sensor unit and the own-vehicle with position information in the table maintained by the vehicle-mounted communication device and determines a vehicle having an error which is equal to or below a predetermined threshold value as the following traveling vehicle.

3. A driving control device according to claim 1, wherein the travel control unit changes the lane after the vehicle-mounted communication device receives, from the following traveling vehicle, a reply to acknowledge a lane change by unicast.

4. A driving control device according to claim 1, wherein when the lane is changed, the vehicle-mounted communication device transmits, to the circumferential vehicle, information on the lane change by broadcast.

5. A driving control device according to claim 1, wherein when the lane change is completed, the vehicle-mounted communication device transmits, to the following traveling vehicle, a content to notify completion of the lane change by unicast.

6. A driving control method for controlling driving of a vehicle when a lane is changed, the driving control method comprising:
identifying a following traveling vehicle on a change destination lane through a sensor unit mounted on an own-vehicle;
transmitting and receiving information including an identification number and position information between a vehicle-mounted communication device mounted on the own-vehicle and a vehicle-mounted communication device mounted on a circumferential vehicle of the own-vehicle and maintaining the information as a table;
selecting the identification number of the following traveling vehicle from the table maintained by the vehicle-mounted communication device and transmitting information on a lane change request, to the following traveling vehicle using the identification number by unicast; and
performing a lane change after the vehicle-mounted communication device receives, from the following traveling vehicle, a reply to acknowledge the lane change by unicast.

7. A driving control method according to claim 6, wherein a relative distance between the circumferential vehicle detected by the sensor unit and the own-vehicle and position information in the table maintained by the vehicle-mounted communication device are compared and a vehicle having an error which is equal to or below a predetermined threshold value is determined as the following traveling vehicle.

8. A vehicle-to-vehicle communication system for performing a communication among moving vehicles using the driving control device according to claim 1, wherein:
a following traveling vehicle on a change destination lane is identified by the sensor unit mounted on an own-vehicle when a lane is changed;
information including an identification number and position information is mutually transmitted and received between the vehicle-mounted communication device mounted on the own-vehicle and a vehicle-mounted communication device mounted on a circumferential vehicle of the own-vehicle and the information is maintained as a table;
the identification number of the following traveling vehicle is selected from the table maintained by the vehicle-mounted communication device and information on a lane change request is transmitted to the following traveling vehicle using the identification number by unicast; and
a lane change is performed after the vehicle-mounted communication device receives, from the following traveling vehicle, a reply to acknowledge the lane change by unicast.

9. A vehicle-to-vehicle communication system according to claim 8, wherein a relative distance between the circumferential vehicle detected by the sensor unit and the own-vehicle and position information in the table maintained by the vehicle-mounted communication device are compared and a vehicle having an error which is equal to or below a predetermined threshold value is determined as the following traveling vehicle.

10. A record medium recording a drive control program for controlling driving a vehicle when a lane is changed, the record medium causing a computer to execute the processes of:

identifying a following traveling vehicle on a change destination lane by a sensor unit mounted on an own-vehicle;

mutually transmitting and receiving information including an identification number and position information between a vehicle-mounted communication device mounted on the own-vehicle and a vehicle-mounted communication device mounted on a circumferential vehicle of the own-vehicle and maintaining the information as a table;

selecting the identification number of the following traveling vehicle from the table maintained by the vehicle-mounted communication device and transmitting, to the following traveling vehicle, information on a lane change request using the identification number by unicast; and performing a lane change after the vehicle-mounted communication device receives, from the following traveling vehicle, a reply to acknowledge the lane change by unicast.

* * * * *